United States Patent
Keating et al.

(10) Patent No.: US 9,316,151 B2
(45) Date of Patent: Apr. 19, 2016

(54) ENGINE ASSEMBLY INCLUDING CRANKSHAFT FOR V8 ARRANGEMENT

(75) Inventors: Edward J. Keating, Ortonville, MI (US); Robert S. McAlpine, Lake Orion, MI (US); Akram R. Zahdeh, Rochester Hills, MI (US); Hatem Zakaria Orban, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 940 days.

(21) Appl. No.: 13/030,581

(22) Filed: Feb. 18, 2011

(65) Prior Publication Data

US 2012/0210958 A1 Aug. 23, 2012

(51) Int. Cl.
F02B 75/32 (2006.01)
F02B 75/22 (2006.01)
F16C 3/20 (2006.01)
F02B 75/18 (2006.01)

(52) U.S. Cl.
CPC . F02B 75/22 (2013.01); F16C 3/20 (2013.01); F02B 2075/1832 (2013.01); Y10T 74/2174 (2015.01)

(58) Field of Classification Search
USPC ......... 123/197.1, 197.2, 197.4, 198 F; 74/595
See application file for complete search history.

(56) References Cited

U.S. PATENT DOCUMENTS

| | | | |
|---|---|---|---|
| 1,584,279 A | 5/1926 | Duesenberg | |
| 1,911,874 A | 5/1933 | Barkeij | |
| 2,680,427 A | 6/1954 | Summers | |
| 3,308,680 A | 3/1967 | Sherrick | |
| 4,833,940 A | 5/1989 | Ito | |
| 5,138,859 A * | 8/1992 | Winkens | 72/110 |
| 5,615,651 A * | 4/1997 | Miyachi | 123/198 F |
| 6,158,218 A * | 12/2000 | Herold et al. | 60/609 |
| 6,874,463 B1 * | 4/2005 | Bolander et al. | 123/198 F |
| 7,610,903 B2 * | 11/2009 | Maehara et al. | 123/481 |
| 8,176,891 B2 * | 5/2012 | Choi | 123/198 F |
| 8,191,516 B2 * | 6/2012 | Moon et al. | 123/64 |
| 2005/0279320 A1 * | 12/2005 | Roberts et al. | 123/198 F |
| 2007/0261659 A1 * | 11/2007 | Tidwell | 123/197.4 |

FOREIGN PATENT DOCUMENTS

DE 10207077 A1 2/2003

OTHER PUBLICATIONS

Popular Science, Oct. 1995, p. 37.*

* cited by examiner

*Primary Examiner* — Lindsay Low
*Assistant Examiner* — Omar Morales
(74) *Attorney, Agent, or Firm* — Harness, Dickey & Pierce, P.L.C.

(57) ABSTRACT

A crankshaft for a V8 engine includes first, second, third, fourth, fifth, sixth, seventh and eighth crank pins defined on the crankshaft. The second crank pin is rotationally offset from the first crank pin, the third crank pin is rotationally offset from the first and second crank pins, the fourth crank pin is rotationally offset from the first, second and third crank pins, the fifth crank pin is rotationally offset from the first, second, third and fourth crank pins, and the sixth pin is rotationally offset from the first, second, third, fourth and fifth crank pins. The seventh crank pin is rotationally aligned with the first crank pin and the eighth crank pin is rotationally aligned with the second crank pin.

18 Claims, 4 Drawing Sheets

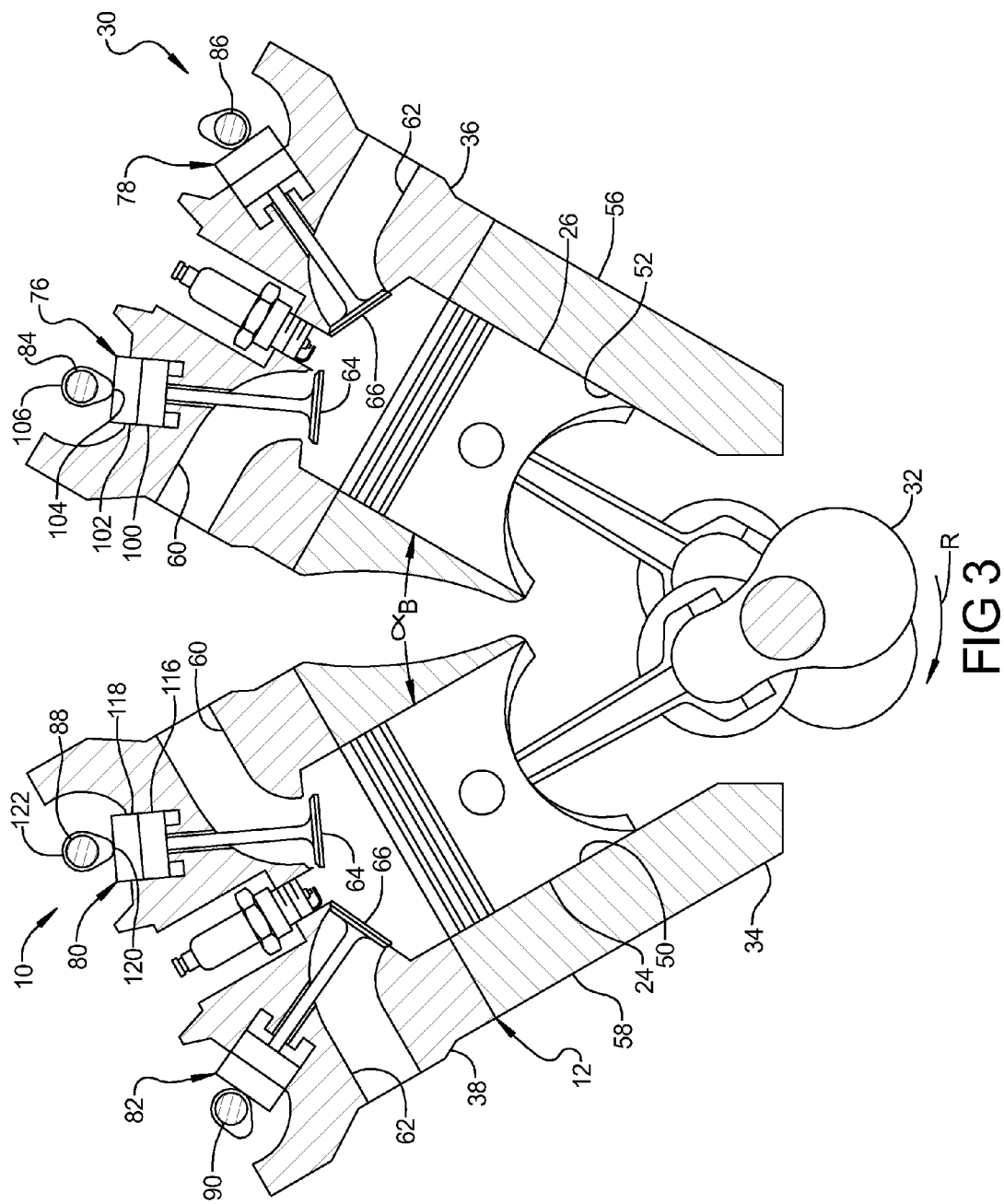

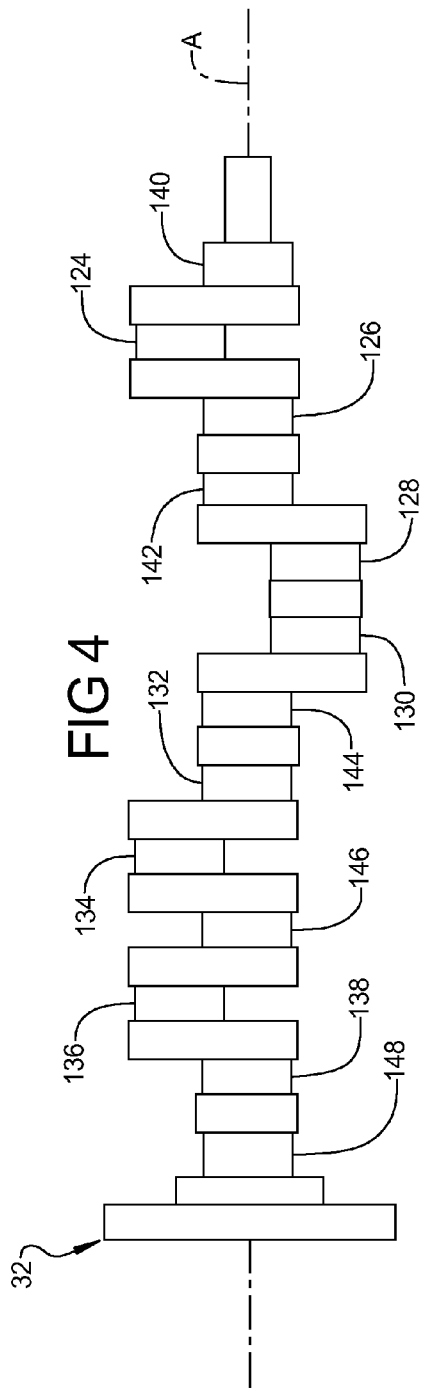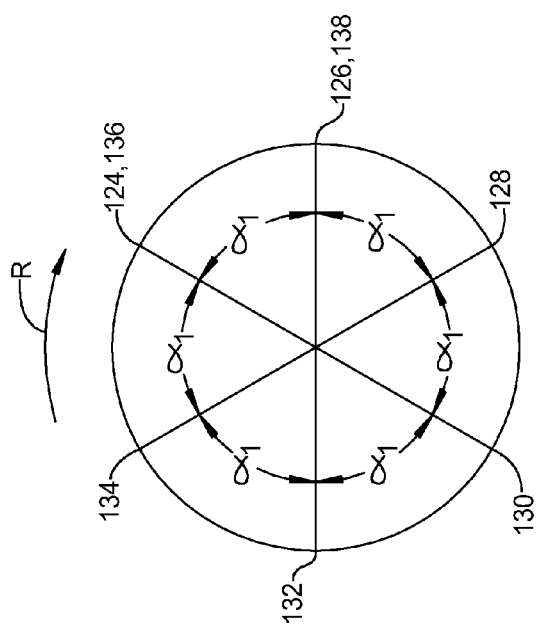

ENGINE ASSEMBLY INCLUDING CRANKSHAFT FOR V8 ARRANGEMENT

FIELD

The present disclosure relates to engine crankshafts.

BACKGROUND

This section provides background information related to the present disclosure which is not necessarily prior art.

Eight cylinder engines may incorporate the use of one or more balance shafts to accommodate an imbalance created by the crankshaft, connecting rod and piston assembly. Additionally, operating an eight cylinder engine in a mode where one or two of the cylinders are temporarily disabled for operation firing seven or less of the eight cylinders may typically result in a firing period that is different than eight cylinder operation.

SUMMARY

A crankshaft for a V8 engine may include first, second, third, fourth, fifth, sixth, seventh and eighth crank pins defined on the crankshaft. The second crank pin may be rotationally offset from the first crank pin, the third crank pin may be rotationally offset from the first and second crank pins, the fourth crank pin may be rotationally offset from the first, second and third crank pins, the fifth crank pin may be rotationally offset from the first, second, third and fourth crank pins, and the sixth pin may be rotationally offset from the first, second, third, fourth and fifth crank pins. The seventh crank pin may be rotationally aligned with the first crank pin and the eighth crank pin may be rotationally aligned with the second crank pin.

The crankshaft may be incorporated into an engine assembly including an engine structure having an engine block defining a first bank of cylinders defining four cylinders and a second bank of cylinders defining four cylinders forming a V8 arrangement.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 3 is an additional schematic section view of the engine assembly of FIG. 1;

FIG. 4 is a side view of a crankshaft included in the engine assembly of FIG. 1; and FIG. 5 is a schematic illustration of crank pin orientation on the crankshaft of FIG. 4.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
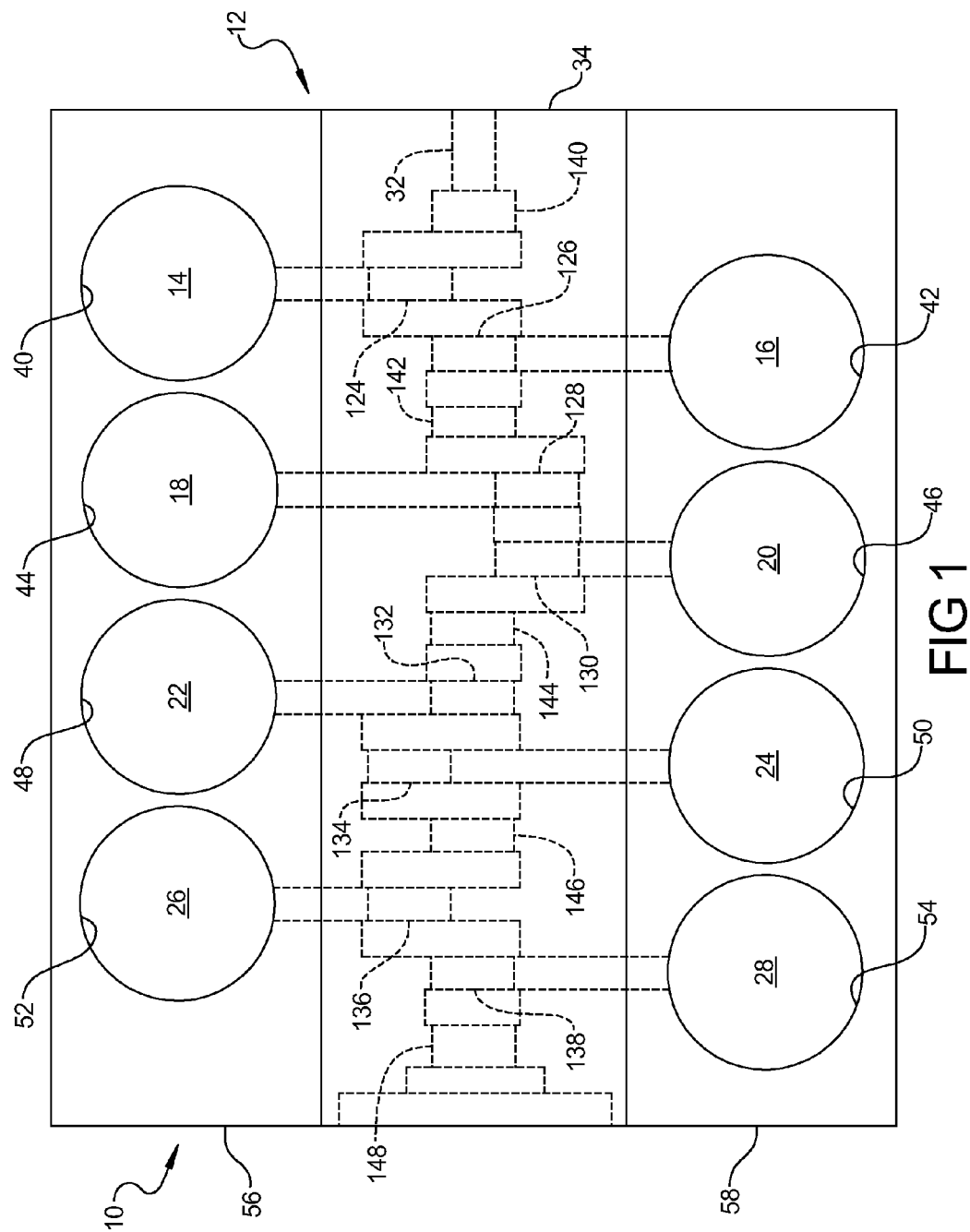
FIG. 1 is a schematic illustration of an engine assembly according to the present disclosure.
Figure 2:
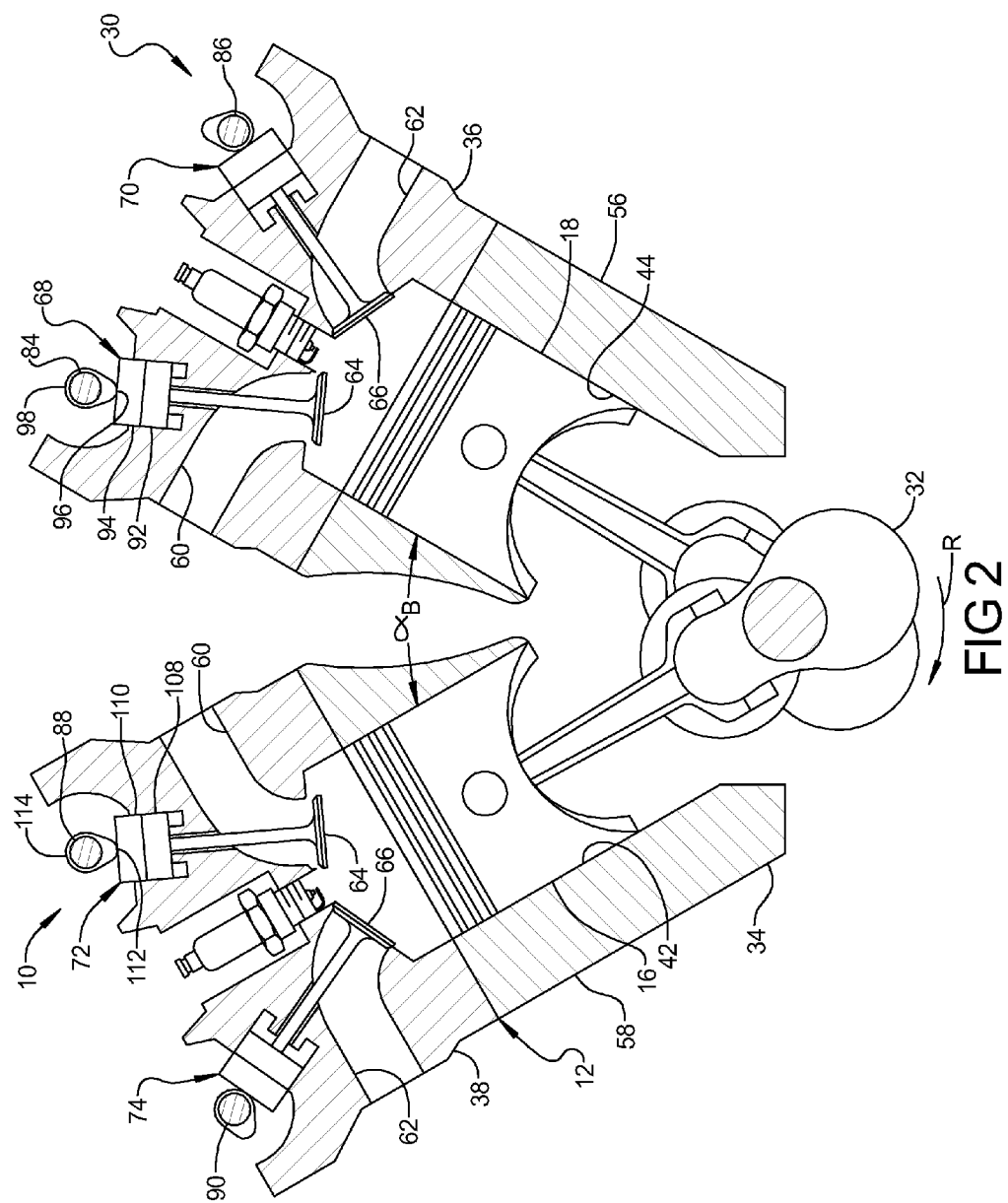
FIG. 2 is a schematic section view of the engine assembly of FIG. 1.

An engine assembly 10 is illustrated in FIGS. 1-3 and may include an engine structure 12, first, second, third, fourth, fifth, sixth, seventh and eighth pistons 14, 16, 18, 20, 22, 24, 26, 28, a valvetrain assembly 30 and a crankshaft 32. The engine structure 12 may include an engine block 34, a first cylinder head 36 and a second cylinder head 38. The engine structure 12 may define first, second, third, fourth, fifth, sixth, seventh and eighth cylinders 40, 42, 44, 46, 48, 50, 52, 54 in the engine block 34. In the present non-limiting example, the engine block 34 includes a first bank of cylinders 56 defining four cylinders and a second bank of cylinders 58 defining four cylinders.

The first, third, fifth and seventh cylinders 40, 44, 48, 52 may be defined in the first bank 56 and the second, fourth, sixth and eighth cylinders 42, 46, 50, 54 may be defined in the second bank 58. A bank angle ($\alpha_B$) may be defined between the first and second banks of cylinders 56, 58 forming a V8 engine arrangement. The first piston 14 may be located in the first cylinder 40, the second piston 16 may be located in the second cylinder 42, the third piston 18 may be located in the third cylinder 44, the fourth piston 20 may be located in the fourth cylinder 46, the fifth piston 22 may be located in the fifth cylinder 48, the sixth piston 24 may be located in the sixth cylinder 50, the seventh piston 26 may be located in the seventh cylinder 52, and the eighth piston 28 may be located in the eighth cylinder 54.

As seen in FIGS. 2 and 3, the engine structure 12 may define intake ports 60 and exhaust ports 62 in the first cylinder head 36 in communication with the first, third, fifth and seventh cylinders 40, 44, 48, 52. Similarly, the engine structure 12 may define intake ports 60 and exhaust ports 62 in the second cylinder head 38 in communication with the second, fourth, sixth and eighth cylinders 42, 46, 50, 54. The section view illustrated in FIG. 2 includes the second and third cylinders 42, 44 and the section view illustrated in FIG. 3 includes the sixth and seventh cylinders 50, 52. For illustration purposes, the second and third pistons 16, 18 are illustrated in a top dead center (TDC) position in FIG. 2 and the sixth and seventh pistons 24, 26 are illustrated in a TDC position in FIG. 3. For simplicity, the port arrangement and valvetrain corresponding to the first, fourth, fifth and eighth cylinders 40, 46, 48, 54 will not be described in detail with the understanding that the description relative to the second, third, sixth and seventh cylinders 42, 44, 50, 52 applies equally as indicated below.

The valvetrain assembly 30 may include intake valves 64 located in the intake ports 60 and exhaust valves 66 located in the exhaust ports 62, valve lift mechanisms 68, 70, 72, 74, 76, 78, 80, 82 and camshafts 84, 86, 88, 90. While illustrated as an overhead cam arrangement, it is understood that the present disclosure is not limited to overhead cam arrangements and applies equally to a variety of other engine configurations including, but not limited to, cam-in-block (or pushrod) arrangements.

The camshafts 84, 88 may be engaged with the valve lift mechanisms 68, 72, 76, 80 respectively, to displace the intake valves 64 between open and closed positions. Similarly, the camshafts 86, 90 may be engaged with the valve lift mechanisms 70, 74, 78, 82 respectively, to displace the exhaust valves 66 between open and closed positions.

In the present non-limiting example, the valve lift mechanism 68 may form a first valve lift mechanism operable in a first mode and a second mode. More specifically, the valve lift mechanism 68 may include a first member 92 engaged with the intake valve 64 and a second member 94 engaged with the camshaft 84. In the first mode, the first and second members 92, 94 may be fixed for displacement with one another such that the intake valve 64 is displaced to an open position when a peak 96 of a first cam lobe 98 on the camshaft 84 engages the valve lift mechanism 68. In the second mode, the first and second members 92, 94 may be displaceable relative to one another such that the intake valve 64 remains in a closed position when the peak 96 of the first cam lobe 98 engages the valve lift mechanism 68.

The valve lift mechanism 76 may form a second valve lift mechanism operable in the first mode and the second mode. Similar to the arrangement discussed above, the valve lift mechanism 76 may include a first member 100 engaged with the intake valve 64 and a second member 102 engaged with the camshaft 84. In the first mode, the first and second members 100, 102 may be fixed for displacement with one another such that the intake valve 64 is displaced to an open position when a peak 104 of a second cam lobe 106 on the camshaft 84 engages the valve lift mechanism 76. In the second mode, the first and second members 100, 102 may be displaceable relative to one another such that the intake valve 64 remains in a closed position when the peak 104 of the second cam lobe 106 engages the valve lift mechanism 76.

Alternatively, the valve lift mechanism 72 may form the first valve lift mechanism operable in the first mode and the second mode. More specifically, the valve lift mechanism 72 may include a first member 108 engaged with the intake valve 64 and a second member 110 engaged with the camshaft 88.

In the first mode, the first and second members 108, 110 may be fixed for displacement with one another such that the intake valve 64 is displaced to an open position when a peak 112 of a first cam lobe 114 on the camshaft 88 engages the valve lift mechanism 72. In the second mode, the first and second members 108, 110 may be displaceable relative to one another such that the intake valve 64 remains in a closed position when the peak 112 of the first cam lobe 114 engages the valve lift mechanism 72.

Similarly, the valve lift mechanism 80 may form the second valve lift mechanism operable in the first mode and the second mode. As discussed above, the valve lift mechanism 80 may include a first member 116 engaged with the intake valve 64 and a second member 118 engaged with the camshaft 88. In the first mode, the first and second members 116, 118 may be fixed for displacement with one another such that the intake valve 64 is displaced to an open position when a peak 120 of a second cam lobe 122 on the camshaft 88 engages the valve lift mechanism 80. In the second mode, the first and second members 116, 118 may be displaceable relative to one another such that the intake valve 64 remains in a closed position when the peak 120 of the second cam lobe 122 engages the valve lift mechanism 80.

A variety of combinations may be employed using the valve lift mechanisms 68, 72, 76, 80. By way of non-limiting example, a first arrangement may include operating the valve lift mechanisms 68, 76 in the second mode to provide operation of the engine assembly 10 using only six cylinders (first, second, fourth, fifth, sixth and eighth cylinders 40, 42, 46, 48, 50, 54). A second arrangement may include operating the valve lift mechanisms 72, 80 in the second mode to provide operation of the engine assembly 10 using only six cylinders (first, third, fourth, fifth, seventh and eighth cylinders 40, 44, 46, 48, 52, 54). A third arrangement may include operating the valve lift mechanisms 68, 80 in the second mode to provide operation of the engine assembly 10 using only six cylinders (first, second, fourth, fifth, seventh and eighth cylinders 40, 42, 46, 48, 52, 54). A fourth arrangement may include operating the valve lift mechanisms 72, 76 in the second mode to provide operation of the engine assembly using only six cylinders (first, third, fourth, fifth, sixth and eighth cylinders 40, 44, 46, 48, 50, 54). A fifth arrangement may include operating one of the valve lift mechanisms 68, 72, 76, 80 in the second mode to provide operation of the engine assembly 10 using only seven cylinders (all cylinders operating except the second, third, sixth or seventh cylinder 42, 44, 50, 52).

The crankshaft 32 may be rotationally supported on the engine structure 12 by the engine block 34 and may include a first crank pin 124, a second crank pin 126, a third crank pin 128, a fourth crank pin 130, a fifth crank pin 132, a sixth crank pin 134, a seventh crank pin 136 and an eighth crank pin 138 each located radially outward from a rotational axis (A) of the crankshaft 32. The first piston 14 may be coupled to the first crank pin 124, the second piston 16 may be coupled to the second crank pin 126, the third piston 18 may be coupled to the third crank pin 128, the fourth piston 20 may be coupled to the fourth crank pin 130, the fifth piston 22 may be coupled to the fifth crank pin 132, the sixth piston 24 may be coupled to the sixth crank pin 134, the seventh piston 26 may be coupled to the seventh crank pin 136 and eighth piston 28 may be coupled to the eighth crank pin 138.

The first crank pin 124 may be located at a first axial end of the crankshaft 32 and the eighth crank pin 138 may be located at a second axial end of the crankshaft 32. The second crank pin 126 may be located axially between the first crank pin 124 and the eighth crank pin 138. The third crank pin 128 may be located axially between the second crank pin 126 and the eighth crank pin 138. The fourth crank pin 130 may be located axially between the third crank pin 128 and the eighth crank pin 138. The fifth crank pin 132 may be located axially between the fourth crank pin 130 and the eighth crank pin 138. The sixth crank pin 134 may be located axially between the fifth crank pin 132 and the eighth crank pin 138. The seventh crank pin 136 may be located axially between the sixth crank pin 134 and the eighth crank pin 138.

The crankshaft 32 may include a first bearing journal 140 at the first axial end of the crankshaft 32, a second bearing journal 142 axially between the second and third crank pins 126, 128, a third bearing journal 144 axially between the fourth and fifth crank pins 130, 132, a fourth bearing journal 146 axially between the sixth and seventh crank pins 134, 136, and a fifth bearing journal 148 at the second axial end of the crankshaft 32.

The first, second, third, fourth, fifth and sixth crank pins 124, 126, 128, 130, 132, 134 may be rotationally offset from one another. In the present non-limiting example, the second crank pin 126 is rotationally offset from the first crank pin 124 by a first angle ($\alpha_1$) in a rotational direction (R) of the crankshaft 32. Similarly, the third crank pin 128 may be rotationally offset from the second crank pin 126 in the rotational direction (R) by the first angle ($\alpha_1$), the fourth crank pin 130 may be rotationally offset from the third crank pin 128 in the rotational direction (R) by the first angle ($\alpha_1$), the fifth crank pin 132 may be rotationally offset from the fourth crank pin 130 in the rotational direction (R) by the first angle ($\alpha_1$), the sixth crank pin 134 may be rotationally offset from the fifth crank pin 132 in the rotational direction (R) by the first angle ($\alpha_1$), the seventh crank pin 136 may be rotationally aligned with the first crank pin 124 and the eighth crank pin 138 may be rotationally aligned with the second crank pin 126. In the present non-limiting example, the first angle ($\alpha_1$) is sixty degrees.

The first angle ($\alpha_1$) may be equal to the bank angle ($\alpha_B$) defined between the first and second banks of cylinders 56, 58. In the present non-limiting example, the first angle ($\alpha_1$) and the bank angle ($\alpha_B$) are both sixty degrees. The arrangement of the crankshaft 32 may generally provide for primary balance in the engine assembly 10 through the use of crankshaft counterweighting and without the use of balance shafts. Engine primary balance is achieved when the forces and moments occurring at the first harmonic of crankshaft rotation created by the crankshaft, connecting rod and piston assembly are balanced.

The arrangement of the crankshaft 32 also provides for a common firing interval during both engine operation including firing all eight cylinders 40, 42, 44, 46, 48, 50, 52, 54 every seven hundred and twenty degrees of crankshaft rotation and engine operation including only firing six or seven of the eight cylinders 40, 42, 44, 46, 48, 50, 52, 54 every seven hundred and twenty degrees of crankshaft rotation (i.e., operation in the first, second, third, fourth, or fifth arrangements discussed above). For example, the engine assembly 10 may define a first firing interval during operation including firing all eight cylinders 40, 42, 44, 46, 48, 50, 52, 54, a second firing interval equal to the first firing interval including firing only six of the eight cylinders 40, 42, 44, 46, 48, 50, 52, 54 and a third firing interval equal to the first firing interval including firing only seven of the eight cylinders 40, 42, 44, 46, 48, 50, 52, 54.

The first, second and third firing intervals may each include a combustion event every one hundred and twenty degrees of crankshaft rotation. Therefore, an even firing interval may be provided during any of the first, second, third, fourth and fifth arrangements discussed above. In the present non-limiting example, this arrangement is made possible by firing the second cylinder 42 at the same time as the third cylinder 44 and firing the sixth cylinder 50 at the same time as the seventh cylinder 52 (i.e., the second cylinder 42 having a combustion event at the same time as the third cylinder 44 and the sixth cylinder 50 having a combustion event at the same time as the seventh cylinder 52). The firing order may include firing the first cylinder 40, then firing the eighth cylinder 54, then firing the second and third cylinders 42, 44 at the same time, then firing the sixth and seventh cylinders 50, 52 at the same time, then firing the fourth cylinder 46, and then firing the fifth cylinder 48.

What is claimed is:

1. A V8 engine crankshaft comprising:
a first crank pin defined on the crankshaft;
a second crank pin defined on the crankshaft and rotationally offset from the first crank pin;
a third crank pin defined on the crankshaft and rotationally offset from the first and second crank pins;
a fourth crank pin defined on the crankshaft and rotationally offset from the first, second and third crank pins;
a fifth crank pin defined on the crankshaft and rotationally offset from the first, second, third and fourth crank pins;
a sixth crank pin defined on the crankshaft and rotationally offset from the first, second, third, fourth and fifth crank pins;
a seventh crank pin defined on the crankshaft and rotationally aligned with the first crank pin; and
an eighth crank pin defined on the crankshaft and rotationally aligned with the second crank pin.

2. The V8 engine crankshaft of claim 1, wherein the second crank pin is rotationally offset from the first crank pin in a rotational direction of the crankshaft by a first angle, the third crank pin is rotationally offset from the second crank pin in the rotational direction by the first angle, the fourth crank pin is rotationally offset from the third crank pin in the rotational direction by the first angle, the fifth crank pin is rotationally offset from the fourth crank pin in the rotational direction by the first angle and the sixth crank pin is rotationally offset from the fifth crank pin in the rotational direction by the first angle.

3. The V8 engine crankshaft of claim 2, wherein the first angle is equal to a bank angle defined between a first bank of cylinders and a second bank of cylinders defined in a V8 engine block housing the crankshaft.

4. The V8 engine crankshaft of claim 2, wherein the first angle is 60 degrees.

5. The V8 engine crankshaft of claim 1, wherein the first crank pin is located at a first axial end of the crankshaft and the eighth crank pin is located at a second axial end of the crankshaft with the second crank pin located axially between the first and eighth crank pins, the third crank pin located axially between the second and eighth crank pins, the fourth crank pin located axially between the third and eighth crank pins, the fifth crank pin located axially between the fourth and eighth crank pins, the sixth crank pin located axially between the fifth and eighth crank pins, and the seventh crank pin located axially between the sixth and eighth crank pins.

6. The V8 engine crankshaft of claim 5, wherein the second crank pin is rotationally offset from the first crank pin in a rotational direction of the crankshaft by 60 degrees, the third crank pin is rotationally offset from the second crank pin in the rotational direction by 60 degrees, the fourth crank pin is rotationally offset from the third crank pin in the rotational direction by 60 degrees, the fifth crank pin is rotationally offset from the fourth crank pin in the rotational direction by 60 degrees and the sixth crank pin is rotationally offset from the fifth crank pin in the rotational direction by 60 degrees.

7. The V8 engine crankshaft of claim 6, wherein the first, third, fifth and seventh crank pins are each engaged with a piston located in a first bank of cylinders defined in a V8 engine block housing the crankshaft and the second, fourth, sixth and eighth crank pins are each engaged with a piston located in a second bank of cylinders defined in the V8 engine block extending at an angle of 60 degrees relative to the first bank of cylinders.

8. An engine assembly comprising:
an engine structure including an engine block defining a first bank of cylinders including four cylinders and a second bank of cylinders including four cylinders forming a V8 arrangement; and
a crankshaft rotationally supported on the engine structure and including a first crank pin, a second crank pin rotationally offset from the first crank pin, a third crank pin rotationally offset from the first and second crank pins, a fourth crank pin rotationally offset from the first, second and third crank pins, a fifth crank pin rotationally offset from the first, second, third and fourth crank pins, a sixth crank pin rotationally offset from the first, second, third, fourth and fifth crank pins, a seventh crank pin rotationally aligned with the first crank pin, and an eighth crank pin rotationally aligned with the second crank pin.

9. The engine assembly of claim 8, wherein the second crank pin is rotationally offset from the first crank pin in a rotational direction of the crankshaft by a first angle, the third crank pin is rotationally offset from the second crank pin in the rotational direction by the first angle, the fourth crank pin is rotationally offset from the third crank pin in the rotational direction by the first angle, the fifth crank pin is rotationally offset from the fourth crank pin in the rotational direction by the first angle and the sixth crank pin is rotationally offset from the fifth crank pin in the rotational direction by the first angle.

10. The engine assembly of claim 9, wherein the first angle is equal to a bank angle defined between the first bank of cylinders and the second bank of cylinders.

11. The engine assembly of claim 9, wherein the first angle is 60 degrees.

12. The engine assembly of claim 8, wherein the first crank pin is located at a first axial end of the crankshaft and the eighth crank pin is located at a second axial end of the crankshaft with the second crank pin located axially between the first and eighth crank pins, the third crank pin located axially between the second and eighth crank pins, the fourth crank pin located axially between the third and eighth crank pins, the fifth crank pin located axially between the fourth and eighth crank pins, the sixth crank pin located axially between the fifth and eighth crank pins, and the seventh crank pin located axially between the sixth and eighth crank pins.

13. The engine assembly of claim 12, wherein the second crank pin is rotationally offset from the first crank pin in a rotational direction of the crankshaft by 60 degrees, the third crank pin is rotationally offset from the second crank pin in the rotational direction by 60 degrees, the fourth crank pin is rotationally offset from the third crank pin in the rotational direction by 60 degrees, the fifth crank pin is rotationally offset from the fourth crank pin in the rotational direction by 60 degrees and the sixth crank pin is rotationally offset from the fifth crank pin in the rotational direction by 60 degrees.

14. The engine assembly of claim 12, further comprising a first piston coupled to the first crank pin, a second piston coupled to the second crank pin, a third piston coupled to the third crank pin, a fourth piston coupled to the fourth crank pin, a fifth piston coupled to the fifth crank pin, a sixth piston coupled to the sixth crank pin, a seventh piston coupled to the seventh crank pin, and an eighth piston coupled to the eighth crank pin, the first, third, fifth and seventh pistons each being located in a cylinder defined in the first bank of cylinders and the second, fourth, sixth and eighth pistons each being located in a cylinder defined in the second bank of cylinders, the second bank of cylinders extending at an angle of 60 degrees relative to the first bank of cylinders.

15. The engine assembly of claim 8, further comprising a first piston coupled to the first crank pin and located in a first cylinder defined in the first bank of cylinders, a second piston coupled to the second crank pin and located in a second cylinder defined in the second bank of cylinders, a third piston coupled to the third crank pin and located in a third cylinder defined in the first bank of cylinders, a fourth piston coupled to the fourth crank pin and located in a fourth cylinder defined in the second bank of cylinders, a fifth piston coupled to the fifth crank pin and located in a fifth cylinder defined in the first bank of cylinders, a sixth piston coupled to the sixth crank pin and located in a sixth cylinder defined in the second bank of cylinders, a seventh piston coupled to the seventh crank pin and located in a seventh cylinder defined in the first bank of cylinders, and an eighth piston coupled to the eighth crank pin and located in an eighth cylinder defined in the second bank of cylinders, the engine assembly defining a firing order including the second cylinder and the third cylinder having a combustion event at the same time and the sixth cylinder and the seventh cylinder having a combustion event at the same time.

16. The engine assembly of claim 15, wherein the engine structure defines a first port in communication with one of the second and third cylinders, a first valve located within the first port, a first valve lift mechanism engaged with the first valve and a first cam lobe engaged with the first valve lift mechanism, the first valve lift mechanism being operable in a first mode and a second mode, the first mode including the first valve being displaced to an open position when the first valve lift mechanism is engaged by a peak of the first cam lobe and the second mode including the first valve remaining in a closed position when the first valve lift mechanism is engaged by the peak of the first cam lobe, the engine assembly defines a first firing interval when the first valve lift mechanism is operated in the first mode and a second firing interval equal to the first firing interval when the first valve lift mechanism is operated in the second mode.

17. The engine assembly of claim 16, wherein the engine structure defines a second port in communication with one of the sixth and seventh cylinders, a second valve located within the second port, a second valve lift mechanism engaged with the second valve and a second cam lobe engaged with the second valve lift mechanism, the second valve lift mechanism being operable in the first mode and the second mode, the first mode including the second valve being displaced to an open position when the second valve lift mechanism is engaged by a peak of the second cam lobe and the second mode including the second valve remaining in a closed position when the second valve lift mechanism is engaged by the peak of the second cam lobe, the engine assembly defining the first firing interval when the first and second valve lift mechanisms are operated in the first mode and the second firing interval equal to the first firing interval when the first and second valve lift mechanisms are operated in the second mode.

18. The engine assembly of claim 17, wherein the first firing interval and the second firing interval each include a combustion event every 120 degrees of rotation of the crankshaft.

* * * * *